United States Patent [19]

Curtin

[11] 4,260,181
[45] Apr. 7, 1981

[54] PIPE COUPLING

[76] Inventor: Hoyt S. Curtin, 3706 Capstan Cir., Westlake, Calif. 91361

[21] Appl. No.: 937,137

[22] Filed: Aug. 28, 1978

Related U.S. Application Data

[63] Continuation-in-part of Ser. No. 695,462, Jun. 14, 1976, Pat. No. 4,109,944.

[51] Int. Cl.³ .................. F16L 13/10; F16L 21/06; F16L 47/00
[52] U.S. Cl. .................... 285/15; 138/99; 285/21; 285/177; 285/286; 285/419; 285/423; 403/270; 403/341; 156/308.4
[58] Field of Search ............... 285/15, 21, 177, 286, 285/292, 373, 419, 423; 138/99, 97; 156/308, 307; 403/270, 286, 313, 341

[56] References Cited

U.S. PATENT DOCUMENTS

| | | | |
|---|---|---|---|
| 863,887 | 8/1907 | Stuttle | 285/373 |
| 1,982,850 | 12/1934 | Banks | 285/286 X |
| 2,306,180 | 12/1942 | Myers et al. | 285/286 X |
| 3,087,849 | 4/1963 | Smith | 156/307 |
| 3,229,998 | 1/1966 | Pennington | 285/419 |
| 3,231,298 | 1/1966 | Tomb et al. | 285/373 X |
| 3,401,957 | 9/1968 | McCright et al. | 285/286 X |
| 3,633,947 | 1/1972 | Nelson | 285/423 X |
| 3,649,055 | 3/1972 | Nilsen | 138/99 X |
| 3,771,820 | 11/1973 | Hoss, Sr. et al. | 285/423 X |
| 3,857,588 | 12/1974 | Curtin | 285/423 X |

FOREIGN PATENT DOCUMENTS

| | | | |
|---|---|---|---|
| 2037950 | 2/1972 | Fed. Rep. of Germany | 285/373 |
| 45-26761 | 9/1970 | Japan | 403/270 |

OTHER PUBLICATIONS

"Branson Sonic Power:Joint Design for Ultrasonic Welding", Bulletin #56a, Copyright Cert. #886,998 of Jan. 24, 1967 (2 pages).

Primary Examiner—Roy D. Frazier
Assistant Examiner—Carl F. Pietruszka
Attorney, Agent, or Firm—Freilich, Hornbaker, Wasserman, Rosen & Fernandez

[57] ABSTRACT

A pipe coupling useful in plumbing systems formed of unthreaded pipes for repairing damaged portions of said systems, particularly those portions occurring immediately adjacent emplaced couplings, such as an L or T coupling. A coupling in accordance with the invention is comprised of a pair of substantially semi-cylindrical pipe sections having longitudinal edges formed so as to mate with one another to hold the sections together. The sections are sized so a first end has an internal diameter substantially equal to the external diameter of the emplaced pipe so as to fit closely therearound, whereby an adhesive applied therebetween forms a water-tight seal. A second end of the sections is enlarged so as to fit around and engage and thereby be adapted to form a water-tight seal with the external diameter of the emplaced coupling.

4 Claims, 9 Drawing Figures

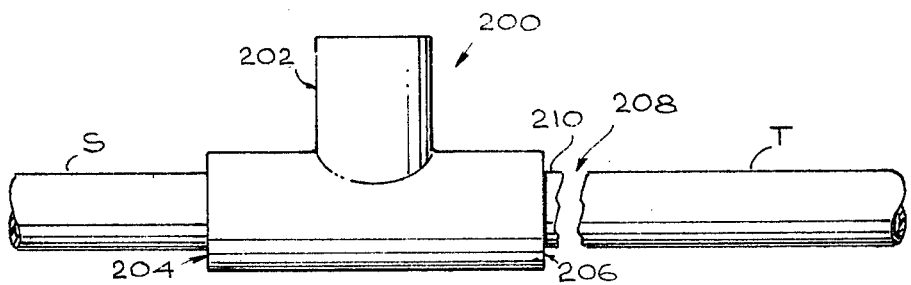
Fig. 3
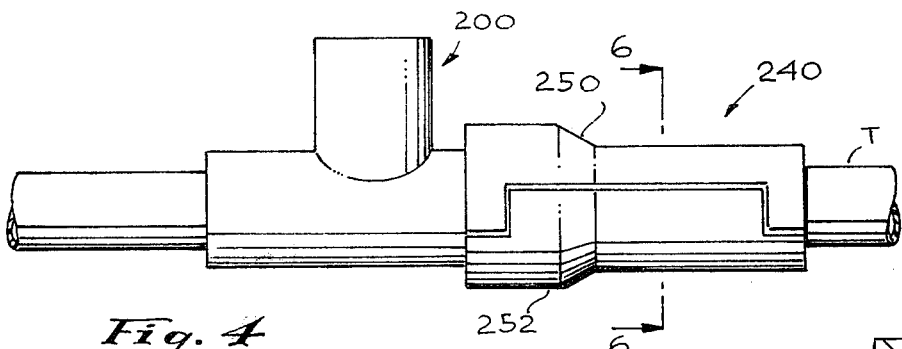
Fig. 4
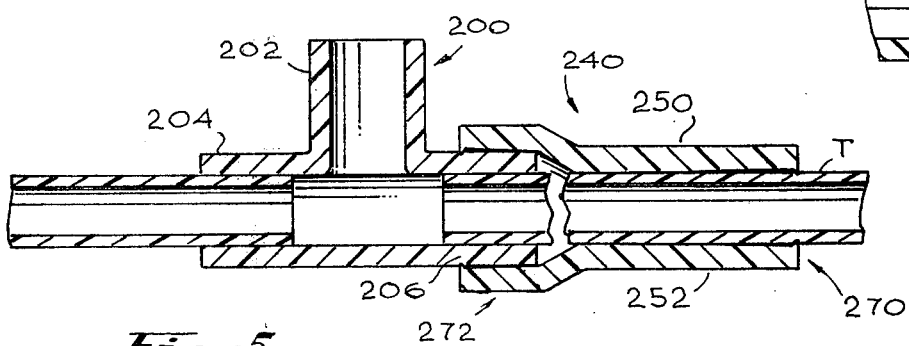
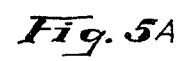
Fig. 5A
Fig. 5
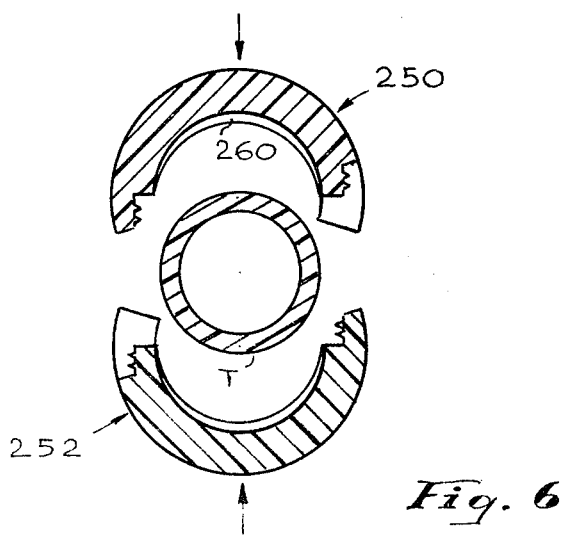
Fig. 6

PIPE COUPLING

RELATED APPLICATIONS

This application is a continuation-in-part of U.S. patent application Ser. No. 695,462, filed June 14, 1976 (now U.S. Pat. No. 4,109,944, issued Aug. 29, 1978).

BACKGROUND OF THE INVENTION

This invention relates to pipe couplings, and more particularly to pipe couplings particularly useful for repairing damaged portions of unthreaded plastic pipe plumbing systems.

Plastic pipes have become widely used in sprinkler and other plumbing systems because of their low cost and ease of connection and repair. Such pipes are commonly referred to as PVC pipes because they are generally formed of some type of polyvinyl chloride composition. They are typically joined without threading by applying an adhesive such as a solvent cement to the ends of the pipes and then slipping the ends into a smooth bore coupling.

Various improved couplings have been previously disclosed which are particularly adapted for facilitating the use of unthreaded plastic pipe systems; e.g. see Applicant's U.S. Pat. Nos. 3,857,588; 3,971,574; 4,035,002; 4,103,943.

SUMMARY OF THE INVENTION

The present invention is directed to further improvements in pipe couplings useful for repairing damaged portions of unthreaded plastic pipe systems. More particularly, the present invention is directed to couplings for repairing pipe breaks which occur immediately adjacent emplaced couplings such as L or T couplings.

In accordance with a first embodiment of the invention, a coupling is formed of two substantially semi-cylindrical pipe sections having longitudinal edges formed so as to mate with one another to hold the sections together. The sections are sized so a first end has an internal diameter substantially equal to the external diameter of the emplaced pipe to enable it to fit closely therearound whereby an adhesive applied therebetween can form a water-tight seal. A second end of the sections is enlarged so as to fit around and engage the external diameter of the emplaced coupling so that an adhesive applied therebetween can form a water-tight seal.

A first embodiment is preferably comprised of identical semi-cylindrical pipe sections having saw-tooth surfaces formed along their mating longitudinal edges. A notch is formed at each end of one edge, while at each end of the other edge a lug is formed. When the semi-cylindrical pipe sections are joined, the lugs on one section mate with the notches of the other section and vice-versa. The interlocking lugs and notches thus provide surfaces upon which an adhesive solvent can be applied to create a water-tight seal preventing leakage longitudinally along the pipe surface. Thin flanges provided at the ends of the pipe sections project radially inwardly from the pipe section inner wall surface. In use, the flanges are softened by the solvent, so as to deform when the sections are squeezed around the emplaced coupling and pipe to provide a further water block therebetween.

In a second embodiment of the invention, a coupling is formed by a flexible gasket which defines an enlarged internal diameter at one end for receiving the enlarged external diameter of an emplaced coupling. The other end of the gasket has a smaller internal diameter for engaging the external diameter of an emplaced pipe. A rigid sleeve, slidable along the emplaced pipe, has a tapered internal diameter enabling it to be slid over the gasket around both the emplaced pipe and coupling.

The novel features of the invention are set forth with particularly in the appended claims. The invention will best be understood from the following description when read in conjunction with the accompanying drawings.

BRIEF DESCRIPTION OF THE DRAWING

FIG. 3 is a side elevational view depicting a break in a pipe system between an emplaced pipe and an emplaced coupling;

FIG. 4 is a side elevational view showing a first embodiment in accordance with the present invention;

FIG. 5 is a side sectional view depicting a first embodiment of the present invention;

FIG. 5a is an enlarged sectional view of a portion of FIG. 5;

FIG. 6 is a sectional view taken substantially along the plane 6—6 of FIG. 4 showing the two semi-cylindrical pipe sections separated;

DETAILED DESCRIPTION OF THE DISCLOSED EMBODIMENTS

Figure 1:
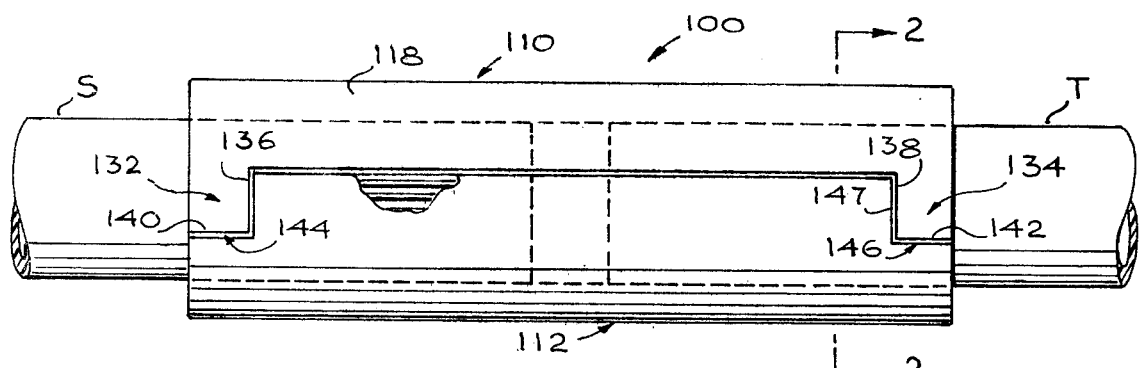
FIG. 1 is an elevation view, partially broken away, of a coupling disclosed in Applicant's parent application Ser. No. 695,462.
Figure 2:
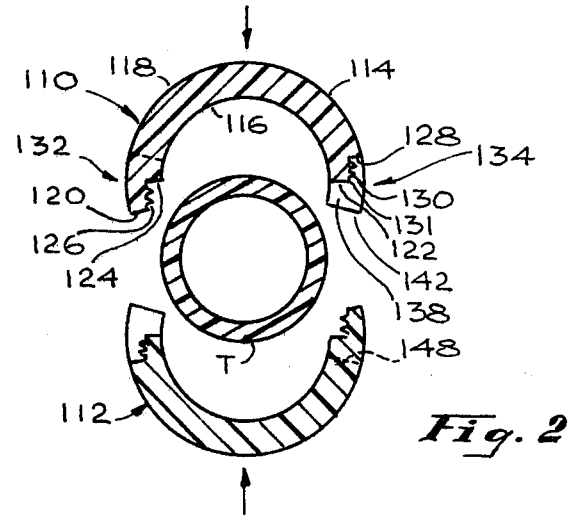
FIG. 2 is a sectional view taken substantially along the plane 2—2 of FIG. 1 showing the semi-cylindrical pipe section separated.

Attention is initially called to FIGS. 1 and 2 which illustrate a pipe coupling 100 previously disclosed in Applicant's parent application Ser. No. 695,462, filed June 14, 1976 (now U.S. Pat. No. 4,109,944, issued Aug. 29, 1978). The coupling 100 is comprised of semi-cylindrical pipe sections 110 and 112 which are configured so as to automatically interlock relative to one another when they are squeezed around emplaced pipes S and T to be repaired.

The semi-cylindrical pipe sections 110 and 112 are identical to one another and each is formed by a wall 114 having inner and outer circumferential surfaces 116 and 118, and first and second longitudinal edges 120 and 122. A shoulder 124 is formed proximate to the longitudinal edge 120 and extends between the inner surface 116 and an exposed surface 126. A shoulder 128 is formed proximate to the longitudinal edge 122 and extends between the outer surface 118 and an exposed surface 130. The exposed surfaces 126 and 130 extend substantially parallel to one another and preferably lie on a tangent to a concentric circular path about the common axis of the pipe sections. A series of serrations or teeth 131 are formed on the exposed surfaces 126 and 130.

The wall 114 of pipe section 110, as can best be seen in FIG. 1, is shaped to define lugs 132 and 134 adjacent each end of the pipe section edge 122. More particularly, the surface 130 of pipe section 110 extends to and terminates at shoulders 136 and 138, which shoulders define the inner boundaries of the lugs. The lugs 132 and 134 respectively have terminal surfaces 140 and 142 extending parallel to the axis of the pipe sections and perpendicular to the shoulders 136 and 138 respectively. As can best be seen in FIG. 1, the surface 142 extends beyond the longitudinal edge 122.

Whereas projecting lugs 132 and 134 are formed adjacent the ends of exposed surface 130, notches 144 and 146 are formed in the pipe section adjacent the ends of exposed surface 126 along edge 120. Notch 146, for example, is defined by shoulder 147 adapted to abut lug shoulder 138 and surface 148 adapted to abut lug surface 142. It will be recognized, of course, that the peripheral arcuate path in each pipe section exceeds 180° so as to permit the exposed serrated surfaces of the pipe sections 110 and 112 to overlap.

In the use of the coupling 100 of FIGS. 1 and 2, solvent cement is first applied to surfaces 120, 126, 124, 116, 122, 130, and 128 of both parts 110 and 112, as well as along the end portion of the exterior surfaces of the emplaced pipes S and T. Parts 110 and 112 are then placed around the emplaced pipes S and T so that the lugs 132 and 134 of part 110 align with the notches of the mating part 112, while the notches of part 110 align with the lugs of part 112.

Finally, the parts 110 and 112 are squeezed together so that the teeth 131 of the mating surfaces 126 and 130 interlock and firmly hold parts 110 and 112 in place while the solvent cement cures. Because the surfaces 126 and 130 extend substantially parallel to one another, and because multiple teeth are provided on these surfaces, the pipe sections 110 and 112 are able to accommodate slightly oversized emplaced pipes S and T while still properly interlocking. It should be noted that, when interlocked, the lug surface 142 abuts the notch surface 148 along the plane displaced from the boundary plane between longitudinal edge 122 and shoulder 124. Thus, the adhesive applied to the interlocking surfaces of the lugs and notches forms a water-tight seal acting as a water block against longitudinal migration of water along the pipe between surfaces 120 and 128 and surfaces 122 and 124.

The coupling 100 of FIGS. 1 and 2 is extremely useful for coupling two aligned pieces of pipe S and T which may be of slightly different size, inasmuch as the pipe sections 110 and 112 can form a successful water block for varying degrees of overlapping of the mating surfaces 126 and 130. Although the coupling 100 is extremely useful for connecting aligned pipes, it is not directly applicable to repair a frequent type of pipe break, as illustrated in FIG. 3. More particularly, FIG. 3 illustrates a portion of a typical plastic pipe sprinkler system comprised of pipes S and T having a T coupling 200 connected thereto. In a typical installation, the coupling 200 may consist of an internally-threaded vertical portion 202 and smooth bore horizontally-extending arms 204 and 206. Typically, the pipes S and T are received and cemented in the bores of the arms 204 and 206, and a nipple or riser (not shown) is threaded into the vertical portion 202. A frequently-encountered break in plastic pipe sprinkler systems is illustrated at 208 in FIG. 3, wherein the pipe T breaks immediately adjacent to the end of arm 206 of the T-coupling 200. Since this situation leaves a portion 210 of the pipe T still cemented within the arm 206, there has been no effective way of repairing this type of break other than to remove the T-coupling 200 and replace it with a new coupling, as well as an additional straight pipe section to close the break 208.

An improved coupling 240 is illustrated in FIG. 4 which retains many of the structural features of the coupling 100 shown in FIGS. 1 and 2, but which includes an enlarged end so as to adhere directly to the outer circumferential surface of the arm 206 of coupling 200. More particularly, the coupling 240 is comprised of pipe sections 250 and 252, each formed of walls of substantially semi-cylindrical cross section, as is best depicted in FIG. 6.

The cross section of the coupling 240, as depicted in FIG. 6, is identical to the cross section of previously discussed coupling 100 depicted in FIG. 2, except for the inclusion of thin flanges 260 which are formed on the wall inner surface of the pipe sections 250 and 252, as will be discussed hereinafter. The primary difference between the coupling 240 of FIGS. 4–6 and the coupling 100 of FIGS. 1 and 2 is that the sections 250 and 252 are configured so that the wall inner surface has a smaller inner diameter adjacent one end 270 and a larger inner diameter adjacent a second end 272. More particularly, the pipe sections 250 and 252 are dimensioned so that when they are mated together as depicted in FIG. 4, they will define an inner diameter adjacent ends 270 substantially equal to the outer diameter of emplaced pipe T. On the other hand, the pipe sections 250 and 252 are enlarged adjacent the ends 272 so that, when mated together, they will define an inner diameter adjacent the ends 272 substantially equal to the outer diameter of arm 206 of T coupling 200. Thus, as is best illustrated in FIG. 5, the pipe sections 250 and 252 are dimensioned so as to enable them to mate together, as depicted in FIG. 6, and yet engage the outer circumferential surfaces of both the emplaced pipe T and the arm 206 of the emplaced coupling 200. Prior to installing the sections 250 and 252 around the pipe 210 and arm 206, an appropriate solvent cement as previously described should be applied to the various surfaces. Since the cross section of the coupling 240 illustrated in FIG. 6 is substantially identical to the cross section of the coupling 100 illustrated in FIG. 2, it will not again be described in detail. It should be recognized, however, that the foredescribed characteristic of the coupling 100 which enables it to accommodate over and under-sized pipes is also characteristic of the coupling 240. Thus, if the outer diameter of emplaced pipe T and the outer diameter of arm 206 of coupling 200 is slightly undersized or oversized relative to a predetermined diameter, the coupling 240 can still accommodate these pipes merely by varying the degree of overlapping of the mating surfaces of the sections 250 and 252.

It has previously been mentioned that the pipe sections 250 and 252 of coupling 250 are preferably provided with a thin flange 260 which extends radially inwardly from the inner surface of the pipe section walls. The flanges 260 are formed integral with the pipe section walls and are preferably shaped as shown in FIG. 6; i.e. with the radial dimension being greatest intermediate the longitudinal edges (on the order of 0.02 inches) and gradually diminishing toward the longitudinal edges. The flanges essentially define a knife edge which, in use, are softened by the applied solvent cement so that when the pipe sections 250 and 252 are squeezed around the emplaced coupling arm 206 and pipe T and then twisted, the flanges will deform to thus conform to the outer circumferential surfaces of the arm 206 and pipe T. Although FIG. 5 illustrates the flanges formed on both ends of the pipe sections 250, 252, it is pointed out that multiple flanges 260 can be provided along the length of the pipe sections to essentially form pockets to retain the solvent cement so as to better assure the formation of water blocks.

Figure 7:
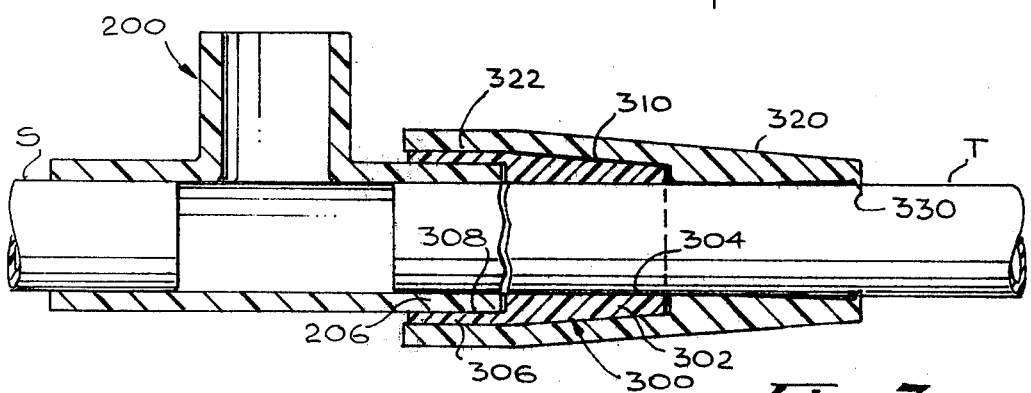
FIG. 7 is a side sectional view of a further embodiment of the present invention.

Attention is now called to FIG. 7 which illustrates a further embodiment of the invention for repairing the type of pipe break illustrated in FIG. 3. That is, FIG. 7 illustrates a coupling for providing a water-tight seal between emplaced pipe T and arm 206 of emplaced T coupling 200. The coupling of FIG. 7 is comprised of a flexible gasket 300 formed of a suitable plastic material such as PVC which reacts to the same solvent cement to which the other parts of the system, such as the coupling 200 and pipes S and T react. The gasket 300 is essentially toroidally shaped defining a first section 302 having an internal bore 304 of diameter substantially equal to that of the outer diameter of pipe T. The gasket 300 has a second portion 306 defining an enlarged internal bore 308 having an internal diameter substantially equal to the outer diameter of the arm 206 of coupling 200. The gasket 300 has an outer circumferential surface 310 which includes a tapered portion which, as will be discussed hereinafter, in final assembly is adapted to be engaged by an internal cavity wall within a sleeve 320 formed of substantially rigid plastic material. The sleeve 320 is slidable along the pipe T. Thus, in use, in order to repair the pipe break depicted in FIG. 6, the emplaced pipe T is initially bent out of the way slightly to permit the sleeve 320 to be placed on the pipe T and slid to the right and to permit the flexible gasket 300 to be placed as illustrated in FIG. 7 so as to bridge the arm 206 of coupling 200 and the end of pipe T. Prior to placing the gasket 300 and sleeve 320 in position, an appropriate solvent cement is applied to the inner circumferential surfaces of the gasket 300 and sleeve 320. Thereafter, the solvent cement is applied to the outer circumferential surfaces of the pipe T and arm 206 of coupling 200. With the gasket positioned as illustrated in FIG. 7, the sleeve 320 is slid to the left into the position illustrated in FIG. 7. The internally tapered surface 322 of sleeve 320 engages the externally-tapered surface 310 of gasket 300 to force the flexible gasket against coupling 200, placing the gasket into compression around the arm 206 and pipe T.

The sleeve 320 is shaped so as to define an internal bore of substantially the same diameter as the outer diameter of pipe T. A thin flange 330 is defined within the bore to provide an improved water block, as has been previously discussed in connection with flange 260 of the embodiment of FIGS. 4-6. It is pointed out that the size of the flange 300 in FIG. 7, as well as the flange 260 illustrated in FIGS. 4-6, has been somewhat exaggerated for illustrative purposes. Indeed, the flange preferably comprises only a very small rim of material projecting radially inward from the surface of the inner wall and having a maximum radial dimension of perhaps 0.03 inches. It is preferably formed merely by chamfering the mold which forms the coupling part such as part 250 or 252 in the embodiment of FIGS. 4-6 or the sleeve 320 of the embodiment of FIG. 7. In use, as the sleeve 320 is slid to the right along pipe T, it will clean dirt off the pipe and as it is moved to the left, it will spread the solvent cement applied to the outer surface of the pipe. The solvent cement applied to the internal wall will soften the flange and deform and conform it to the outer surface of the pipe to form a water block therewith.

Figure 8:
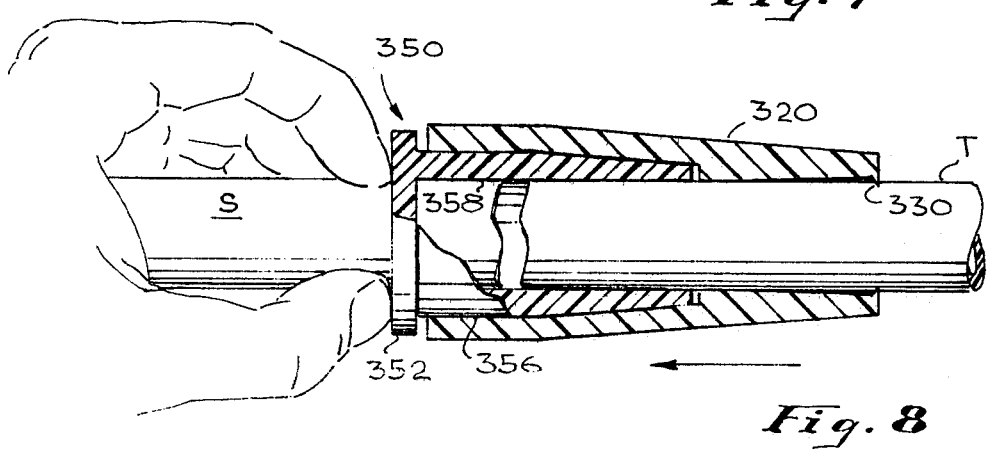
FIG. 8 is a side sectional view of a still further embodiment of the invention.

Attention is now directed to FIG. 8 which illustrates a further embodiment of the invention which is similar to the embodiment of FIG. 7 but which instead of being used to couple a coupling to a pipe, is useful as a straight coupling to connect two pipes S and T. The coupling of FIG. 8 uses the same sleeve 320 as was used in FIG. 7. However, in lieu of using the flexible gasket 300, a flexible gasket 350 is used which is comprised of a ring section 352 and a collar section 356. Both of these parts define an internal bore having a diameter substantially equal to the outer diameter of the pipe S. In use, the break between the pipes S and T is repaired by first misaligning the pipes S and T so as to enable the sleeve 320 to be slid to the right along pipe T. The gasket 350 is then placed over the ends of pipes S and T as shown and then while one hand holds the ring portion 352 of the gasket 350 to prevent its movement along the pipe, the sleeve 320 is forced over the gasket to squeeze it around the pipes S and T. It should be understood of course that prior to installing the gasket 350 in ring 320 on the pipes, an appropriate solvent adhesive is applied to all of the mating surfaces; that is, between the gasket internal bore wall and the pipes S and T, and the gasket outer wall surface and the internal surface of the sleeve 320.

From the foregoing, it should now be appreciated that improved pipe couplings have been disclosed herein for use in plastic pipe plumbing systems for facilitating repair and installation.

Although particular embodiments of the invention have been described and illustrated herein, it is recognized that modifications and variations may readily occur to those skilled in the art, and consequently it is intended that the claims be interpreted to cover such modifications and equivalents.

What is claimed is:

1. A device suitable for being adhered directly to first and second pipes having outer surfaces intended to be of predetermined first and second diameters, respectively, said pipes having open ends spaced by less than a predetermined distance to form a water-tight seal therebetween, said device comprising:

first and second pipe sections each comprised of a substantially semi-cylindrically shaped wall having inner and outer circumferential surfaces, each of said pipe sections including a portion of reduced wall thickness adjacent a first longitudinal edge thereof extending radially inwardly from said outer circumferential surface and a portion of reduced wall thickness adjacent a second longitudinal edge thereof extending radially outwardly from said inner circumferential surface whereby said first and second pipe sections can be mated with their longitudinal edges opposed around said pipes to form a cylinder with the reduced thickness wall portions of each section having surfaces overlapping surfaces on the reduced thickness wall portions of the other section so that said overlapping surfaces can be adhered to one another to form a water-tight seal therebetween, the degree of overlapping being dependent upon the extent to which the actual diameters of said pipes differ from said predetermined diameters;

each of said pipe sections further including at least two lugs substantially of said substantially uniform wall thickness spaced longitudinally by a distance greater than said predetermined distance and formed integral with said wall extending circumferentially beyond one of the longitudinal edges thereof, each lug having a mating surface projecting circumferentially from and perpendicular to the longitudinal edge from which the lug extends;

each of said pipe sections further including at least two notches spaced longitudinally in alignment with said lugs and extending circumferentially inwardly from the other of said longitudinal edges, each notch having a mating surface projecting circumferentially from and perpendicular to the longitudinal edge from which the notch extends, said lug and notch mating surfaces being oriented to remain contiguous to one another for varying degrees of said overlapping whereby said mating surfaces can be adhered to one another to form a water-tight seal and prevent a leak along the opposed longitudinal edges of said pipe sections;

each of said pipe section wall inner surfaces having an inner diameter at a first end thereof substantially equal to the outer diameter of said first pipe and an inner diameter at a second end thereof substantially equal to the outer diameter of said second pipe;

each of said pipe sections further including at least first and second longitudinally spaced thin flanges formed on the wall inner surface thereof and projecting radially inwardly therefrom.

2. A device suitable for being adhered directly to an emplaced pipe having a first outer surface intended to be of predetermined diameter and an emplaced coupling having a second outer surface intended to be of predetermined diameter, said pipe and coupling having open ends spaced by less than a predetermined distance, to form a water-tight seal therebetween, said device comprising:

first and second pipe sections each comprised of a wall of substantially semi-cylindrical cross-section having first and second longitudinal edges and an outer circumferential surface extending from said first edge to a first shoulder extending substantially parallel to and spaced from said second edge and an inner circumferential surface for adhesion directly to said pipe and coupling extending from said second edge to a second shoulder extending substantially parallel to and spaced from said first edge, said wall being of substantially uniform thickness between said first and second shoulders and of reduced thickness between said first shoulder and said second edge and between said second shoulder and said first edge;

each of said pipe sections further including at least two lugs substantially of said substantially uniform wall thickness spaced longitudinally by a distance greater than said predetermined distance and formed integral with said wall extending circumferentially beyond one of the longitudinal edges thereof, and at least two notches formed in said wall extending circumferentially inwardly from the other longitudinal edge thereof;

said lugs and notches being longitudinally aligned whereby said first and second pipe sections can be mated to one another and around said pipe and coupling with their longitudinal edges opposed and with the lugs of each section received in the notches of the other section and with the reduced thickness wall portions of each section having surfaces overlapping surfaces on the reduced thickness wall portions of the other section so that said overlapping surfaces can be adhered to one another to form a watertight seal therebetween, the degree of overlapping being dependent upon the extent to which the actual diameters of said pipe and coupling differ from said respective predetermined diameters, each of said lugs having a mating surface projecting circumferentially beyond and substantially perpendicular to the longitudinal edge from which the lug extends and each of said notches having a mating surface projecting circumferentially inwardly from and substantially perpendicular to the longitudinal edge from which the notch extends, said lug and notch mating surfaces being oriented so as to remain substantially in contact with one another for varying degrees of said overlapping whereby said mating surfaces can be adhered to one another to form a watertight seal and prevent a leak along the opposed longitudinal edges of said pipe sections;

each of said pipe section wall inner surfaces having an inner diameter at a first end thereof substantially equal to the outer diameter of said pipe and an inner diameter at a second end thereof substantially equal to the outer diameter of said coupling.

3. The device of claim 2 including at least first and second longitudinally spaced thin flanges formed on said pipe section wall inner surfaces projecting radially inwardly therefrom.

4. The device of claim 2 wherein said pipe sections are formed of a material which is readily dissolved by a solvent which also dissolves the material of said pipe and said coupling.

* * * * *